US008988430B2

(12) United States Patent
Rice

(10) Patent No.: US 8,988,430 B2
(45) Date of Patent: Mar. 24, 2015

(54) SINGLE PASS HOGEL RENDERING

(71) Applicant: Honeywell International Inc., Morristown, NJ (US)

(72) Inventor: Brian Rice, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 174 days.

(21) Appl. No.: 13/719,501

(22) Filed: Dec. 19, 2012

(65) Prior Publication Data

US 2014/0168213 A1 Jun. 19, 2014

(51) Int. Cl.
*G06T 17/00* (2006.01)
*G03H 1/08* (2006.01)
*G03H 1/22* (2006.01)

(52) U.S. Cl.
CPC .......... *G03H 1/0808* (2013.01); *G03H 1/2294* (2013.01); *G03H 2001/2257* (2013.01); *G03H 2210/30* (2013.01); *G03H 2210/441* (2013.01)
USPC .......................................... 345/420; 345/426

(58) Field of Classification Search
CPC ..................... G03H 2210/30; G03H 2210/454
USPC ........................................ 345/420, 423, 426
See application file for complete search history.

(56) References Cited

U.S. PATENT DOCUMENTS

| 6,366,370 | B1 | 4/2002 | Holzbach et al. | |
|---|---|---|---|---|
| 2009/0009593 | A1 | 1/2009 | Cameron et al. | |
| 2011/0176190 | A1* | 7/2011 | Golan et al. | 359/9 |
| 2011/0249011 | A1 | 10/2011 | LaLonde et al. | |

FOREIGN PATENT DOCUMENTS

| WO | 2010105252 A2 | 9/2010 |
|---|---|---|
| WO | 2011127560 A1 | 10/2011 |

OTHER PUBLICATIONS

EP Exam Report for Application No. EP 13 191 844.3 dated Jan. 4, 2014.
De Sorbier, F. et al.: GPU Rendering for Autostereoscopic Displays, 4th International Symposium on 3D data Processing, Visualization and Transmission (3DPVT'08), Jan. 1, 2008.
EP Search Report for Application No. EP 13 191 844.3 dated Mar. 13, 2014.
Halle, M. et al.; Fast Computer Graphics Rendering for Full Parallax Spatial Displays, Department of Radiology, Brigham and Women's Hospital, Boston, MA; Media Laboratory, Massachusetts Institute of Technology, Cambridge, MA.
Fellner, D. et al.; Toward the Light Field Display: Autostereoscopic Rendering via a Cluster of Projectors; paper 1145 address-line; Eurographics 2006.

* cited by examiner

*Primary Examiner* — Maurice L McDowell, Jr.
(74) *Attorney, Agent, or Firm* — Ingrassia Fisher & Lorenz, P.C.

(57) ABSTRACT

A system and method are provided for rendering a hogel in a single rendering pass. Data representative of a geometric shape having multiple vertices are processed to determine if the geometric shape has at least one vertex on a first side and at least one vertex on a second side of a hologram plane. When the geometric shape has at least one vertex on the first side of a hologram plane and at least one vertex on the second side of the hologram plane, the geometric shape is simultaneously duplicated, in a geometry shader, on the first side of the hologram plane and on the second side of the hologram plane.

13 Claims, 3 Drawing Sheets

SINGLE PASS HOGEL RENDERING

TECHNICAL FIELD

The present invention generally relates to three-dimensional (3D) image rendering, and more particularly relates to rendering 3D hologram elements (hogels) in a single pass.

BACKGROUND

To produce a 3D holographic image suitable for use with a 3D display, such as a light field display, an array of hogels, each representing a different "camera" position on a display surface, are rendered. If the final 3D holographic image is to appear both in front of and behind the display, a double frustum rendering technique is used. With this technique, two opposing camera frusta, one on either side of the hologram plane, are simulated. One particular implementation of the double frustum rendering technique, developed by Michael Halle and Adam Kropp, is described in the technical paper, "Fast Computer Graphics Rendering for Full Parallax Spatial Displays," Proc. Soc. Photo-Opt. Instrum. Eng. (SPIE), 3011: 105-112 (Feb. 10-11, 1997).

Although the presently known double frustum rendering techniques, such as the one mentioned above, are generally robust, these known techniques do suffer certain drawbacks. For example, these presently known techniques typically require multiple (usually two) rendering passes for each hogel. This rendering technique can thus be relatively slow and processor intensive for 3D holographic images that consists of many hogels.

Hence, there is a need for a 3D holographic rendering technique that does not rely on multiple rendering passes for each hogel that comprises a 3D holographic image. The present invention addresses at least this need.

BRIEF SUMMARY

In one embodiment, a method for rendering a hogel in a single rendering pass includes processing data representative of a geometric shape having multiple vertices to determine if the geometric shape has at least one vertex on a first side and at least one vertex on a second side of a hologram plane. When the geometric shape has at least one vertex on the first side of a hologram plane and at least one vertex on the second side of the hologram plane, the geometric shape is simultaneously duplicated, in a geometry shader, on the first side of the hologram plane and on the second side of the hologram plane.

In another embodiment, a method for rendering a hogel in a single rendering pass includes processing data representative of a geometric shape having multiple vertices to determine if the geometric shape has at least one vertex on a first side and at least one vertex on a second side of a hologram plane. When the geometric shape has at least one vertex on the first side of a hologram plane and at least one vertex on the second side of the hologram plane, the geometric shape is simultaneously duplicated, in a geometry shader, on the first side of the hologram plane and on the second side of the hologram plane. A coordinate of each vertex is then adjusted. The geometric shape is rendered on only one side of the hologram when the geometric shape does not have at least one vertex on the first side of a hologram plane and at least one vertex on the second side of the hologram plane.

In yet another embodiment, a display system includes a display device and a processor. The display device is coupled to receive display commands and is configured, in response thereto, to render a 3D holographic image. The processor is in operable communication with the display device. The processor is configured to implement a graphics processor that includes a geometry shader, and is configured to process data representative of a geometric shape having multiple vertices to determine if the geometric shape has at least one vertex on a first side and at least one vertex on a second side of a hologram plane, and when the geometric shape has at least one vertex on the first side of a hologram plane and at least one vertex on the second side of the hologram plane, supply display commands to the display device that causes the display device to simultaneously duplicate, in the geometry shader, the geometric shape on the first side of the hologram plane and on the second side of the hologram plane.

Furthermore, other desirable features and characteristics of the system and method for rendering a hogel in a single pass will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
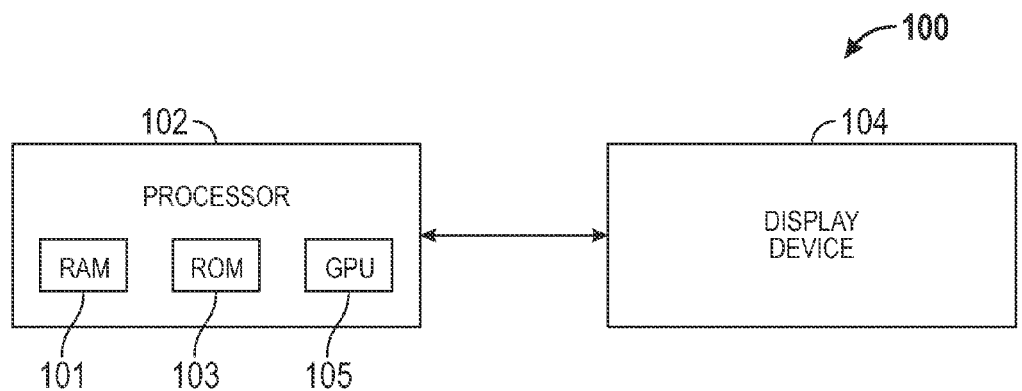
FIG. 1 depicts a functional block diagram of a portion of one embodiment of a display system.

Referring first to FIG. 1, a functional block diagram of a portion of one embodiment of a display system 100 is depicted. The display system 100 includes a processor 102 and a display 104. The processor 102 may be any one of numerous known general-purpose microprocessors or an application specific processor that operates in response to program instructions. In the depicted embodiment, the processor 102 includes on-board RAM (random access memory) 101, and on-board ROM (read only memory) 103. The program instructions that control the processor 104 may be stored in either or both the RAM 101 and the ROM 103. For example, the operating system software may be stored in the ROM 103, whereas various operating mode software routines and various operational parameters may be stored in the RAM 101. It will be appreciated that this is merely exemplary of one scheme for storing operating system software and software routines, and that various other storage schemes may be implemented. It will also be appreciated that the processor 102 may be implemented using various other circuits, not just a programmable processor. For example, digital logic circuits and analog signal processing circuits could also be used. Moreover, the depicted processor 102 includes, or implements the functionality of, a programmable graphics processing unit (GPU) 105.

The display device 104 is in operable communication with the processor 102. The display device 104 is configured to implement any one of numerous types of 3D displays. Preferably, however, the display device is configured to implement a 3D light field display. As is generally known, such a display can be used to render 3D holographic images. The processor 102 is configured to receive and/or retrieve various types of data from one or more non-illustrated data sources, and to supply appropriate display commands to the display device 104. The display device 104, in response to the display commands, selectively renders various types of 3D holographic images. The preferred manner in which the processor 102 commands the display device 104 to render 3D holographic images will be described in more detail further below. Before doing so, however, the general methodology by which the display system 100 renders 3D holographic images will be described.

Figure 2:
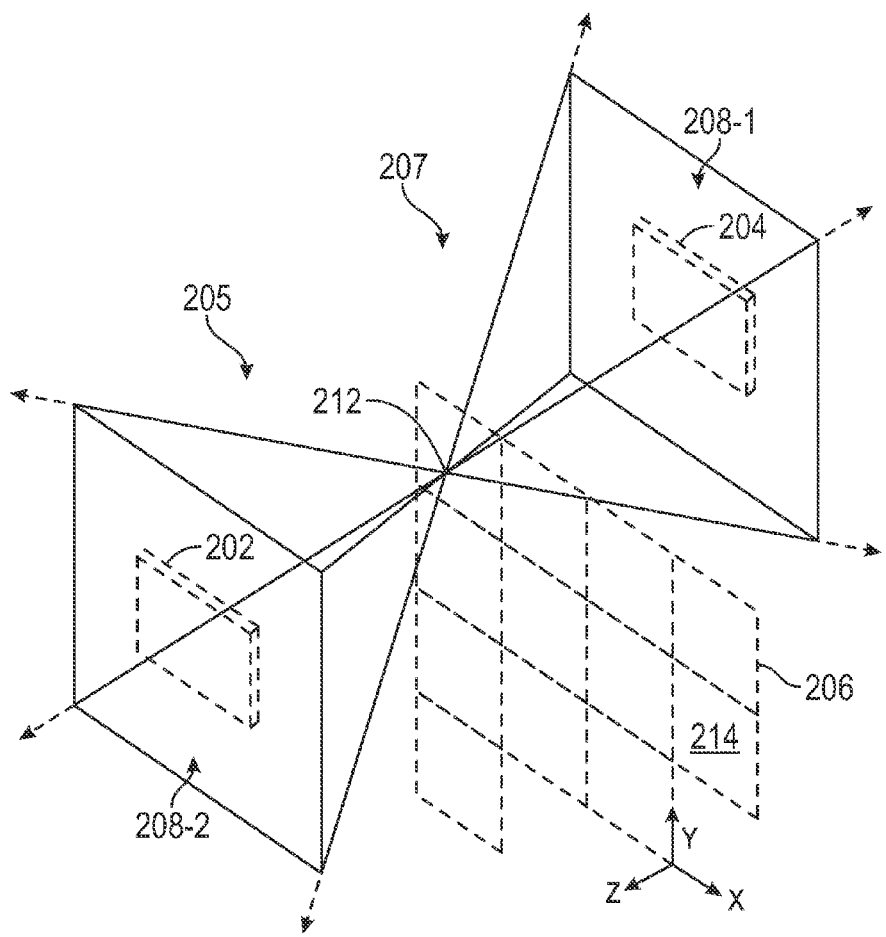
FIGS. 2 and 3 depict a perspective view and a side view, respectively, of an ideal camera geometry for double-frustum rendering.
Figure 3:
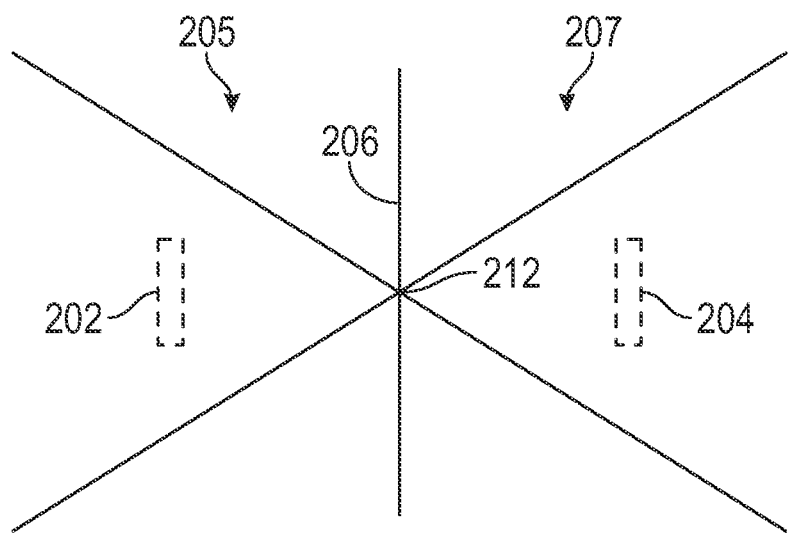

The display system 100 implements a rendering technique that is generally known as the double-frustum rendering. With reference to FIGS. 2 and 3, a perspective view and a side view, respectively, of an ideal camera geometry for double-frustum rendering is depicted. As illustrated in FIGS. 2 and 3, three-dimensional computer graphic objects 202 and 204 are depicted on a first side 205 and a second side 207 of a hologram plane 206, respectively. The hologram plane 206, as is also generally known, is a discrete grid of holographic elements (hogels) 214, each representing a different camera location. The hologram plane 206 is oriented with respect to a Cartesian coordinate system having an x, y, and z axes that extend from an origin and define an x-y plane, an x-z plane, and a y-z plane. The hologram plane 206 is co-planar with the x-y plane.

As FIGS. 2 and 3 further depict, and as is known in the art of computer graphics, the GPU 105 implemented in the processor 102 simulates what is generally referred to as a conjugate-pair of cameras 208 (e.g., 208-1, 208-2) as part of the rendering process. The conjugate-pair of cameras includes a conventional camera 208-1 and a conjugate camera 208-2 disposed on opposing sides of the hologram plane 206. Each of the cameras 208 has an associated eye point 212, which, in the depicted geometry, is located at the hologram plane 206.

During the rendering process, the cameras 208, simulated in the processor 102, are moved together in a predetermined pattern and render each hogel 214 in a single pass. The process that the processor 102 implements to render each hogel 214 in a single pass is depicted in flowchart form in FIG. 4, and with reference thereto will now be described. In doing so, it is noted that the parenthetical references in the following description refer to like-numbered flowchart blocks.

Figure 4:
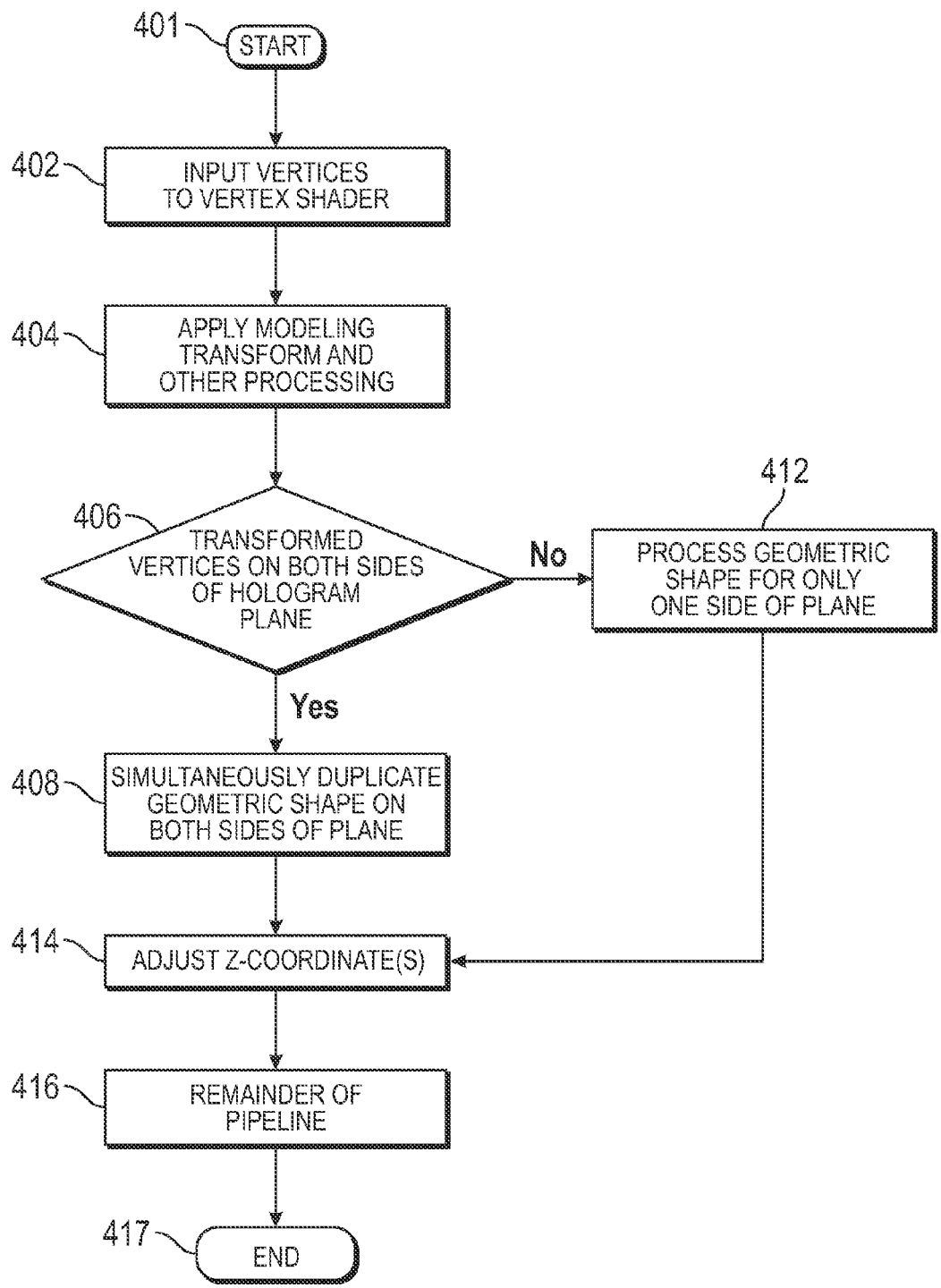
FIG. 4 depicts a process, in flowchart form, which may be implemented by the system of FIG. 1 for rendering a hogel in a single pass.

As FIG. 4 depicts, the process 400 begins when the vertices for the geometric shape(s) to be rendered are input to the vertex shader that is implemented in the processor 102 (402). The vertex shader applies the appropriate modeling transform, implements any one of numerous other vertex processing techniques, such as lighting, and supplies assembled geometric shape(s) to the geometry shader that is implemented in the processor 102 (404). The geometry shader then determines which side 205, 207 of the hologram plane 206 the transformed vertices are on (406), and applies the correct projection(s) for that camera 208. In particular, if the geometry shader determines that the geometric shape has at least one vertex on the first side 205 of the hologram plane 206 and at least one vertex on the second side 207 of the hologram plane 206, the geometry shader simultaneously duplicates the geometric shape on both sides 205, 207 of the hologram plane 206 (408, 412). It should be noted that the geometry shader only duplicates geometric shapes that cross the hologram plane 206. For those that do not, the geometry shader processes the geometric shape for only the first side 205 of the hologram plane 206 (408) or for only the second side 207 of the hologram plane 206 (412).

After the projections, the geometry shader then adjusts the z-coordinate of each vertex (414). This is done so that objects in front of the display device 104 will occlude those behind it. This may be variously implemented, but in a particular embodiment this is accomplished by halving the z-coordinate, and then shifting it in the appropriate direction. Thereafter, the geometric shape is passed on to the remainder of the graphics processing pipeline, such as a rasterizer, a fragment shader, etc., for further processing (416).

The system and method described herein renders a 3D holographic image using one rendering pass per hogel, as opposed to the two rendering passes that are required by conventional rendering techniques.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for rendering a hogel in a single rendering pass, comprising the steps of:
    processing data representative of a geometric shape having multiple vertices to determine if the geometric shape has at least one vertex on a first side and at least one vertex on a second side of a hologram plane;
    when the geometric shape has at least one vertex on the first side of a hologram plane and at least one vertex on the second side of the hologram plane, simultaneously duplicating, in a geometry shader, the geometric shape on the first side of the hologram plane and on the second side of the hologram plane; and
    rendering the geometric shape on only one side of the hologram when the geometric shape does not have at least one vertex on the first side of a hologram plane and at least one vertex on the second side of the hologram plane.

2. The method of claim 1, further comprising:
    adjusting a coordinate of each vertex.

3. The method of claim 2, wherein:
    the hologram plane is oriented with respect to a Cartesian coordinate system having an x, y, and z axes that extend from an origin and define an x-y plane, an x-z plane, and a y-z plane;
    the hologram plane is co-planar with the x-y plane; and
    the step of adjusting a coordinate of each vertex comprises adjusting a z-coordinate of each vertex.

4. The method of claim 1, further comprising:
    simulating, in a graphics processor, a real camera frustum and a conjugate camera frustum, the real camera frustum extending away from the hologram plane on the first side thereof, the conjugate camera frustum extending away from the hologram plane on the second side thereof.

5. The method of claim 1, further comprising:
    rendering the hogel on one or both sides of the hologram plane.

6. A method for rendering a hogel in a single rendering pass, comprising the steps of:
    processing data representative of a geometric shape having multiple vertices to determine if the geometric shape has at least one vertex on a first side and at least one vertex on a second side of a hologram plane;
    when the geometric shape has at least one vertex on the first side of a hologram plane and at least one vertex on the second side of the hologram plane, simultaneously duplicating, in a geometry shader, the geometric shape on the first side of the hologram plane and on the second side of the hologram plane, and adjusting a coordinate of each vertex; and
    rendering the geometric shape on only one side of the hologram when the geometric shape does not have at least one vertex on the first side of a hologram plane and at least one vertex on the second side of the hologram plane.

7. The method of claim 6, wherein:
    the hologram plane is oriented with respect to a Cartesian coordinate system having an x, y, and z axes that extend from an origin and define an x-y plane, an x-z plane, and a y-z plane;
    the hologram plane is co-planar with the x-y plane; and
    the step of adjusting a coordinate of each vertex comprises adjusting a z-coordinate of each vertex.

8. The method of claim 6, further comprising:
    simulating, in a graphics processor, a real camera frustum and a conjugate camera frustum, the real camera frustum extending away from the hologram plane on the first side thereof, the conjugate camera frustum extending away from the hologram plane on the second side thereof.

9. The method of claim 6, further comprising:
    rendering the hogel on one or both sides of the hologram plane.

10. A display system, comprising:
    a display device coupled to receive display commands and configured, in response thereto, to render a 3D holographic image; and
    a processor in operable communication with the display device, the processor configured to implement a graphics processor that includes a geometry shader, the processor further configured to:

process data representative of a geometric shape having multiple vertices to determine if the geometric shape has at least one vertex on a first side and at least one vertex on a second side of a hologram plane, when the geometric shape has at least one vertex on the first side of a hologram plane and at least one vertex on the second side of the hologram plane, supply display commands to the display device that causes the display device to simultaneously duplicate, in the geometry shader, the geometric shape on the first side of the hologram plane and on the second side of the hologram plane; and cause the display device to render the geometric shape on only one side of the hologram when the geometric shape does not have at least one vertex on the first side of a hologram plane and at least one vertex on the second side of the hologram plane.

11. The system of claim 10, wherein the processor is further configured to adjust a coordinate of each vertex.

12. The system of claim 11, wherein:
the hologram plane is oriented with respect to a Cartesian coordinate system having an x, y, and z axes that extend from an origin and define an x-y plane, an x-z plane, and a y-z plane;
the hologram plane is co-planar with the x-y plane; and
the processor is configured to adjust a z-coordinate of each vertex.

13. The system of claim 10, wherein the processor is further configured to simulate a real camera frustum and a conjugate camera frustum, the real camera frustum extending away from the hologram plane on the first side thereof, the conjugate camera frustum extending away from the hologram plane on the second side thereof.

* * * * *